United States Patent
Trevathan

(10) Patent No.: US 8,238,946 B2
(45) Date of Patent: Aug. 7, 2012

(54) METHOD FOR PERSONALIZING MESSAGES DELIVERED TO A COMMUNICATION TERMINAL THAT PRESERVES THE PRIVACY OF THE RECIPIENT OF THE MESSAGE

(75) Inventor: Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 2264 days.

(21) Appl. No.: 10/383,261

(22) Filed: Mar. 7, 2003

(65) Prior Publication Data

US 2004/0203958 A1    Oct. 14, 2004

(51) Int. Cl.
*H04W 4/14* (2009.01)
*H04W 4/12* (2009.01)

(52) U.S. Cl. ..................................... 455/466; 455/412.2
(58) Field of Classification Search .................. 455/466, 455/404.1–404.2, 412, 412.2
See application file for complete search history.

(56) References Cited

U.S. PATENT DOCUMENTS

| | | | | |
|---|---|---|---|---|
| 5,987,137 A * | 11/1999 | Karppanen et al. | ............. | 380/28 |
| 6,157,814 A * | 12/2000 | Hymel et al. | ................ | 340/7.56 |
| 6,263,212 B1 | 7/2001 | Ross et al. | ..................... | 455/466 |
| 6,313,732 B1 * | 11/2001 | DeLuca et al. | ................ | 340/7.2 |
| 6,404,880 B1 * | 6/2002 | Stevens | ..................... | 379/221.11 |
| 6,430,599 B1 * | 8/2002 | Baker et al. | .................... | 709/203 |
| 6,473,621 B1 | 10/2002 | Heie | ............................. | 455/466 |
| 2002/0087401 A1 * | 7/2002 | Leapman et al. | ............... | 705/14 |
| 2002/0090068 A1 | 7/2002 | Song | ......................... | 379/88.13 |
| 2002/0142787 A1 | 10/2002 | Holley et al. | ................ | 455/466 |
| 2002/0174025 A1 * | 11/2002 | Hind et al. | ..................... | 705/26 |
| 2003/0093311 A1 * | 5/2003 | Knowlson | ...................... | 705/10 |

\* cited by examiner

*Primary Examiner* — Rasha Al Aubaidi
(74) *Attorney, Agent, or Firm* — Anna Linne; Roberts Mlotkowski Safran & Cole, P.C.

(57) ABSTRACT

A method for enhancing the privacy of recipients of personalizing text messages such as advertisements delivered to communication terminals such as cellular telephones. A common carrier such as a cellular telephone service provider gathers personal information from a subscriber at the time the subscriber signs on for service and receives a communication terminal. The carrier loads the terminal with a table that assigns variables to elements of personal information. The carrier accepts messages such as advertisements for distribution to subscribers. These messages use the variables that the carrier has loaded into the subscribers' terminals. When such a message is received, a subscriber's terminal replaces the variables with the elements of personal information by referring to the table.

21 Claims, 3 Drawing Sheets

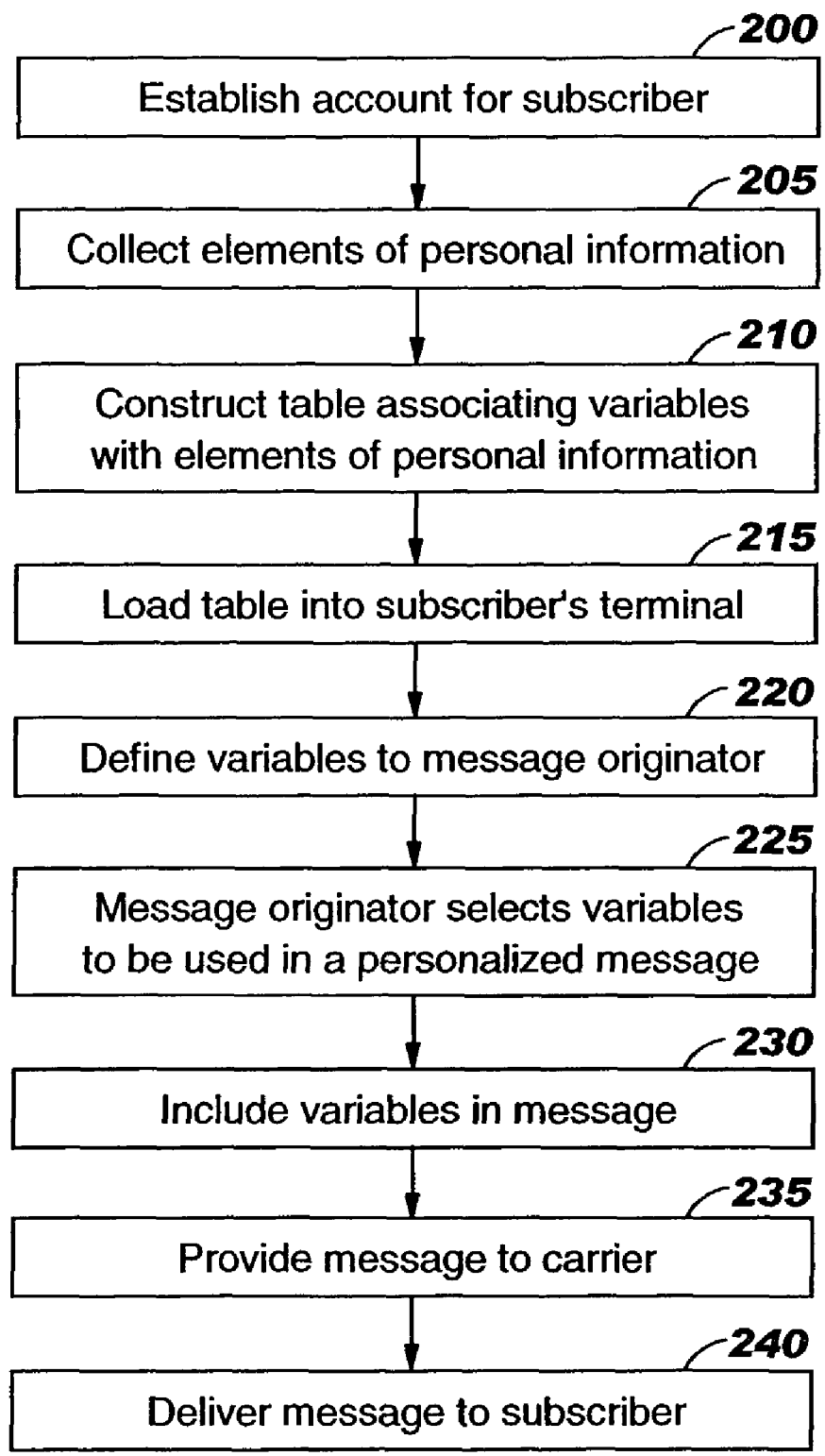

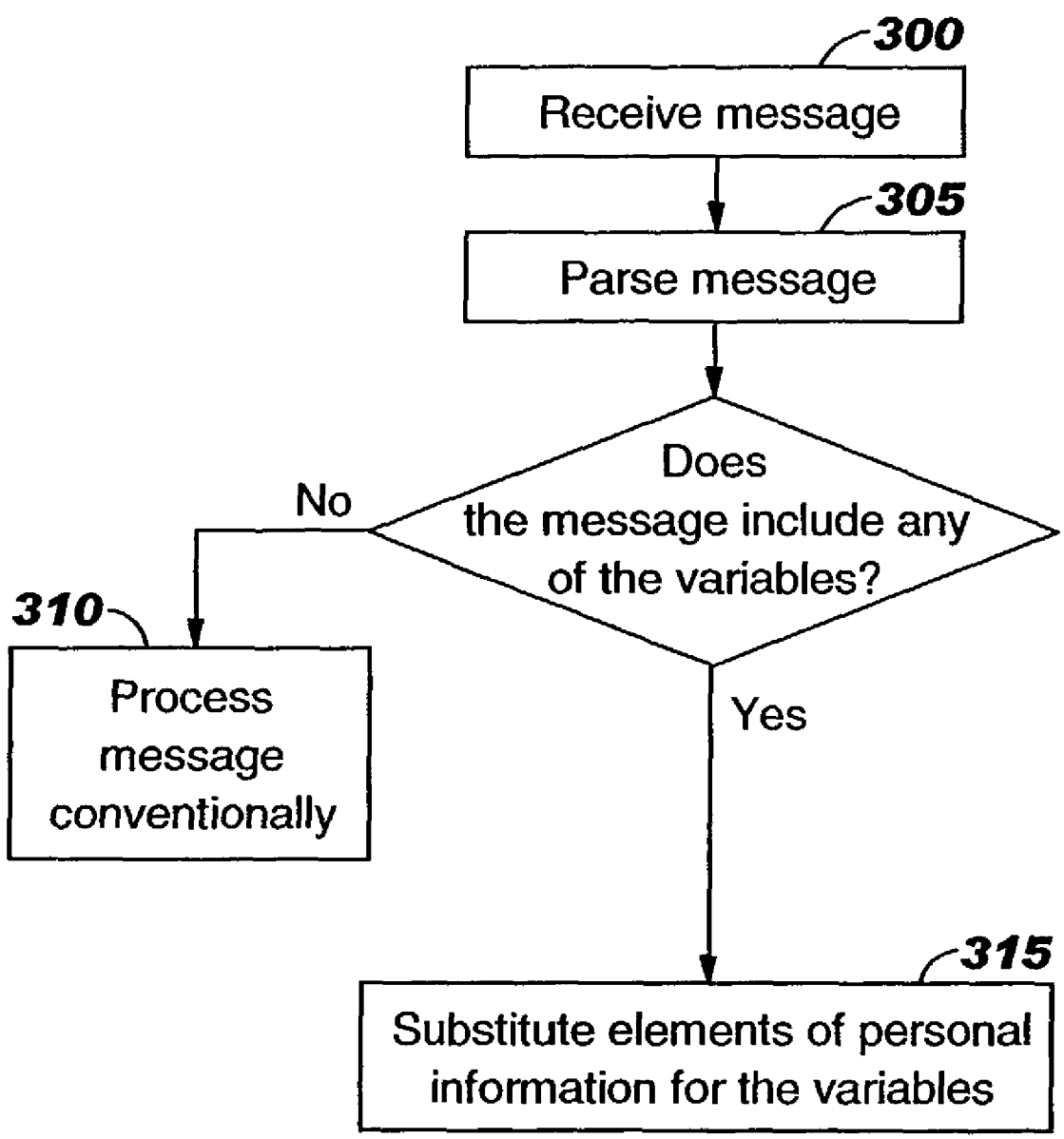

METHOD FOR PERSONALIZING MESSAGES DELIVERED TO A COMMUNICATION TERMINAL THAT PRESERVES THE PRIVACY OF THE RECIPIENT OF THE MESSAGE

FIELD OF THE INVENTION

The invention relates generally to the field of telecommunication, and relates in particular to delivering personalized text messages such as advertisements to communication terminals such as cellular telephones, wherein the method safeguards the privacy of the recipient of the message.

BACKGROUND

Even though much progress has been made in recent years, the cost of advanced communication services continues to deter the adoption of these services by subscribers, particularly with regard to wireless communication services conveyed by cellular telephone systems.

History teaches that advertising has the potential to support a significant share of the cost of communications. In the past, broadcast network television, for example, has been financed entirely through advertising, and has been provided free of charge to consumers throughout the United States. More recently, substantial activities based on the Internet and World Wide Web have been financed through advertising, for example through the use of banners, pop-ups, and the like. Unfortunately, these kinds of advertisements are generally impersonal, and therefore less than fully effective in reaching consumers.

Although personalized advertisements may be expected to be more effective than impersonal advertisements, and so to provide more revenue, a major impediment to personalizing advertisements is the concern for maintaining privacy. Based on their Internet experiences, many consumers are reluctant to allow advertisers to use personal information. This is because consumers are afraid that such information will be abused without any regard for their privacy, leading to a torrent of unwanted "spam," fraudulent billings, and so forth. This fear may be especially acute in the field of wireless communication, where the consumer, who may be a subscriber to a cellular telephone service, typically uses a miniature communication terminal that has a small visual display and a reduced-function keyboard, which together make the task of sorting through and disposing of unwanted messages especially inconvenient.

Thus there is a need for a convenient way of safeguarding consumers' privacy so that revenue derived from personalized advertising may be used to offset some of the cost of advanced telecommunication services, especially in the field of wireless communications.

SUMMARY

The present invention provides a way of personalizing text messages such as advertisements delivered to communication terminals such as cellular telephones, and at the same time provides a degree of separation between consumers who receive these messages and advertisers who send them. With the present invention, privacy is enhanced, and consumers may therefore be more readily willing to accept personalized advertisements.

According to the invention, a common carrier such as a cellular telephone service provider gathers personal information from a subscriber at the time the subscriber signs on for service with the common carrier. As part of establishing an account, the common carrier may provide the subscriber with a communication terminal such as a cellular telephone that has text messaging capability. The carrier loads the terminal with a table that assigns identifiers such as variable names to elements of personal information about the subscriber. For example, the table may associate a first variable with the subscriber's name, a second variable with the subscriber's date of birth, a third variable with the name of the subscriber's spouse, and so forth.

The common carrier then accepts messages, such as advertisements from retail businesses for mass distribution to the carrier's subscribers, and delivers the messages to the subscribers. These messages refer to the variables that the common carrier has loaded into the subscribers' terminals. In this way, personalized advertisement may be generated, for example advertisements that urge subscribers to buy gifts for their spouses on particular holidays. In this example, the advertiser's message would employ the first and third variables, i.e., the subscriber's name and the spouse's name. After receiving such a message, a subscriber's terminal replaces the variables with the elements of the subscriber's personal information, by referring to the table that the carrier loaded into the terminal when the subscriber signed on for service.

The invention may be used to maintain the privacy of the carrier's subscribers, as the originator of mass-mailing messages need not be given any personal information about the subscribers who receive the messages. Rather, this information is carried in the subscribers' communication terminals. Thus the present invention enables a common carrier to maintain its subscribers' privacy and yet accept mass-mailing messages such as advertisements from retail businesses, distribute these messages to the subscribers, and have the messages appear to be personalized when they are read by the subscribers.

BRIEF DESCRIPTION OF THE DRAWINGS

FIGS. 2 and 3 show exemplary flows suitable for implementing the invention, described in the context of FIG. 1.

DETAILED DESCRIPTION

Figure 1:
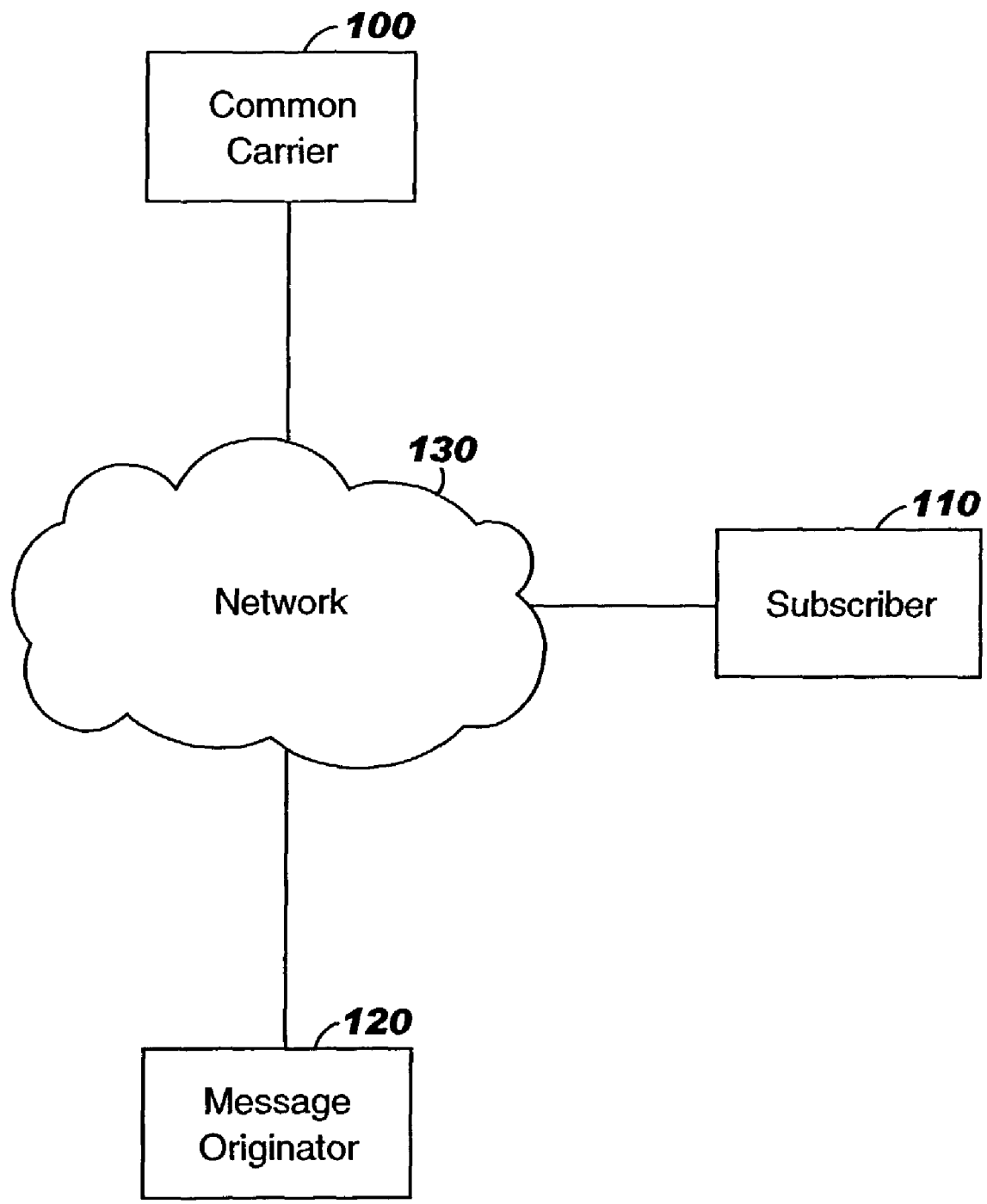
FIG. 1 shows an exemplary context suitable for application of the present invention.

The present invention provides a way of personalizing text messages such as advertisements delivered to communication terminals such as cellular telephones, and at the same time provides a degree of separation between consumers who receive these messages and advertisers who send them. With the present invention, privacy is enhanced, and consumers may therefore be more readily willing to accept personalized advertisements.

FIG. 1 shows an exemplary context suitable for application of the present invention. As shown in the figure, a common carrier 100 provides communication service over a public network 130 connecting a subscriber 110 and a message originator 120. Only one subscriber 110 is shown in the interest of descriptive clarity; the invention applies, of course, to any number of subscribers. In this example, which will be used throughout as a running example to illustrate but not limit the present invention, the common carrier 100 may be, for example, a provider of cellular telephone service who offers wireless text messaging such as cellular-based short message service (SMS). The subscriber 110 may be, for example, an ordinary consumer who establishes a service account with the common carrier 100 for the purpose of receiving communication services such as cellular telephone service and SMS. The message originator 120 may be, for example, a retail business who uses services provided by the common carrier 100 to advertise to targets such as the subscriber 110.

The common carrier 100 gathers personal information from the subscriber 110. This information may be gathered at the time the subscriber 110 signs on for service with the common carrier 100. As part of establishing a service account, the common carrier 100 may provide the subscriber 110 with a communication terminal such as a cellular telephone that has text messaging capability. The common carrier 100 loads the terminal with a table that assigns identifiers such as variables to elements of personal information about the subscriber 110. For example, the table may associate a first variable with the name of the subscriber 110, a second variable with the date of birth of the subscriber 110, a third variable with the name of the spouse of the subscriber 110, and so forth.

The common carrier 100 accepts messages, such as advertisements from the message originator 120 who may be a retail business, for distribution to the carrier's subscribers such as subscriber 110, and delivers the messages to the subscribers. These messages make reference to the variables that occur in the tables which the common carrier 100 has loaded into the subscribers' terminals. In this way, personalized advertisements may be generated, for example advertisements that urge subscribers to buy gifts for their spouses on particular holidays. In this example, the advertiser's message would employ the first and third variables. After receiving such a message, the subscriber's 110 terminal replaces the variables with the name of the subscriber 110 and the name of the spouse, by referring to the table that the common carrier 100 loaded into the terminal when the subscriber 110 signed on for service.

FIG. 2 shows an exemplary flow for the events described above leading to the construction and distribution of a message. As shown in FIG. 2, the common carrier 100 establishes a service account for the subscriber 110 (step 200). At this time, or later, or earlier in preparation, the common carrier 100 collects elements of personal information about the subscriber 110 (step 205). Exemplary elements of personal information include names, addresses, dates of birth, product preferences, interests, and a wide variety of other information. Although the invention is described here in the context of SMS and written language that is displayed to the subscriber 110, the elements of personal information are not so limited, and may also include special characters, images, pointers to other information such as uniform resource locators, and so forth.

The common carrier 100 constructs a table that associates variables with the elements of personal information (step 210). For example, variable x$001 may be the subscriber's name, variable x$002 may be the subscriber's date of birth, variable x$003 may be the name of the subscriber's spouse, and so forth. The table is loaded into the communication terminal intended for use by the subscriber 110 to whom the elements of personal information pertain (step 215). The terminal may be provided to the subscriber 110 by the common carrier 100 at the time that the common carrier 100 establishes the service account for the subscriber 110, although this not a necessary condition of the invention. Rather, in other embodiments of the invention, the common carrier 100 may download or alter the table at a later time via the network 130, or the subscriber 110 may download or alter the table from a personal computer, for example by visiting an appropriate Internet web site, and so forth.

The common carrier 100 provides definitions of the variables of the table to the message originator 120 (step 220). This may be done implicitly or explicitly. An example of an implicit method is for the common carrier 100 and the message originator 120 to adhere to a pre-agreed mapping, wherein like variables are always associated with like elements of personal information. For example, variable x$001 may be known a priori to refer always to subscribers' names, variable x$002 may be known a priori to refer always to subscribers' dates of birth, and so forth. Examples of explicit techniques are for the common carrier 100 to post the definitions on an Internet web site to be accessed by the message originator 120, or for the common carrier 100 to transmit the definitions to the message originator 120 over the public network 130.

The message originator 120 selects the elements of personal information that he or she desires to include in a personalized message (step 225), and includes the associated variables in the message (step 230). In the running example, the message originator 120 may intend to send messages with personalized greetings, in which case the message originator 120 would select variable x$001 as the subscriber's name and include this variable in the greeting line of a message suitable for mass distribution. The message originator 120 provides the message including the selected variables to the common carrier 100 (step 235), and the common carrier 100 distributes the message to subscribers such as subscriber 110 (step 240).

As shown in FIG. 3, the subscriber 110 receives the message (step 300), and processes it upon receipt or stores it for processing later. To process a message, the terminal employed by the subscriber 110 parses to determine which, if any, of the variables that the message includes (step 305). If the message includes none of the variables, the message is processed further according to conventional methods (step 310). Otherwise (i.e., the message includes variables making reference to the table stored earlier in the communication terminal), the communication terminal substitutes the associated element of personal information for each variable (step 315). For example, if the parsing finds variable x$001 in the message line "Hello, x$001," where variable x$001 is associated in the communication terminal's table with the name Hohenstaufen, the communication terminal changes the message line to "Hello, Hohenstaufen." The substitution of elements of personal information for variables may be made by the communication terminal immediately upon receiving the message, or the substitution may be made just prior to displaying the message to the subscriber 110, or the substitution may be made at any time between receiving and displaying the message.

Form the foregoing description, those skilled in the art will now realize that the invention provides a way for message originators such as advertisers to reach subscribers with personalized messages delivered via a common carrier, and yet assures that private information regarding the subscribers does not reach the message originators. The foregoing description is illustrative rather than limiting however, and the invention is limited only by the claims that follow.

I claim:

1. A method for personalizing a message from a message originator delivered by a common carrier to a subscriber of the common carrier, comprising:
   obtaining personal information from the subscriber at a time the subscriber signs on for service with the common carrier;
   creating a table that assigns the personal information of the subscriber to respective variables that are different than the personal information;

loading into a communication terminal used by the subscriber the table that assigns elements of the personal information of the subscriber to the respective variables;

accepting a message from a message originator for mass distribution to subscribers of the common carrier; and delivering the message to the subscriber, wherein the message refers to the variables that the common carrier has loaded into the subscriber's communication terminal in order to provide a personalized message for the subscriber, wherein:

after receiving the message, making reference to the variables that occur in the table so that personalized advertisements can be generated on the subscriber's communication terminal, making reference includes replacing at least one variable with the personal information, by referring to the table that the common carrier loaded onto the communication terminal when the subscriber signed on for service, and the common carrier maintains the personal information of the subscriber without providing the personal information to the message originator by using the variables instead of the personal information, while distributing the mass distribution messages to the subscriber.

2. The method of claim 1, wherein the common carrier provides cellular telephone service and the communication terminal is a wireless terminal capable of displaying text messages.

3. The method of claim 1, wherein the message originator is a retail business.

4. The method of claim 1, wherein the message is an advertisement.

5. The method of claim 1, further comprising processing, with the communication device, the message.

6. The method of claim 1, further comprising substituting, with the communication device, the element of personal information for the variable.

7. The method of claim 1, further comprising providing, from the common carrier to the message originator, a definition of the variable.

8. The method of claim 1, wherein:

the message received from the message originator is processed by determining which, if any, of the variables that the message includes; and when the message includes the variables, the communication terminal substitutes the associated element of personal information for each variable, wherein the substitution of elements of personal information for the variables is be made by one of: the communication terminal immediately upon receiving the message, and just prior to displaying the message to the subscriber, and at any time between receiving and displaying the message.

9. The method of claim 1, further comprising maintaining privacy of the carrier's subscribers, as the message originator is not given the personal information about the subscriber who receives the messages, wherein the personal information of the subscriber is carried in the subscribers' communication terminals thereby enabling the common carrier to maintain the privacy of the subscriber while accepting mass-mailing messages, distribute the messages to the subscriber, and have the messages appear to be personalized when they are read by the subscriber.

10. A method for personalizing a message from a message originator for delivery by a common carrier to a subscriber of the common carrier, comprising:

receiving definitions of variables provided in a table which assigns elements of personal information to the variables, the variables being different than the personal information so that a message originator can provide a personalized message to the subscriber from a mass distribution, without being provided with the personal information of the subscriber;

selecting a variable that is associated in a communication terminal with an element of the personal information about a subscriber of a common carrier service who uses the communication terminal, which is desired to include in the personalized message;

associating the variable and the element of personal information in the communication terminal with the table loaded into the communication terminal by the common carrier; and providing a message to the common carrier for delivery to the subscriber, where the message uses the variable provided by the common carrier to identify the element of personal information about the subscriber to provide the personalized message.

11. The method of claim 10, wherein the common carrier provides cellular telephone service and the communication terminal is a wireless terminal capable of displaying text messages.

12. The method of claim 11, wherein the table is loaded into the communication terminal when the common carrier establishes a service account for the subscriber.

13. The method of claim 10, wherein the message originator is a retail business.

14. The method of claim 10, wherein the message is an advertisement.

15. The method of claim 10, wherein the common carrier collects the element of personal information and constructs the table.

16. The method of claim 10, further comprising substituting, with the communication device, the element of personal information for the variable.

17. The method of claim 10, wherein the receiving definitions of variables is performed implicitly or explicitly.

18. The method of claim 17, wherein the implicitly receiving the definitions comprises the message originator adhering to a pre-agreed mapping, wherein like variables are always associated with like elements of the personal information.

19. The method of claim 18, wherein the explicitly receiving the definitions comprises posting the definitions on an Internet web site to be accessed by the message originator.

20. The method of claim 18, wherein the explicitly receiving the definitions comprises the common carrier transmitting the definitions to the message originator over a public network.

21. A method for personalizing a message from a message originator delivered by a common carrier to a subscriber of the common carrier, comprising:

collecting elements of personal information from the subscriber;

constructing a table that associates variables with the elements of the personal information, the variables being different than the personal information;

loading the table into a communication terminal from the common carrier;

delivering a message from the message originator to the subscriber via the common carrier, said message using the variables to identify the elements of personal information;

accepting the message from the message originator;

delivering the message to the subscriber;

substituting, with the communication device, the elements of personal information for the variables; and providing, from the common carrier to the message originator, definitions of the variables, either implicitly or explicitly, so that the message originator can use the definitions to associate with the elements in the table, in order to provide a personalize message to the subscriber without requiring any of the personal information of the subscriber.

\* \* \* \* \*